Figure 1:
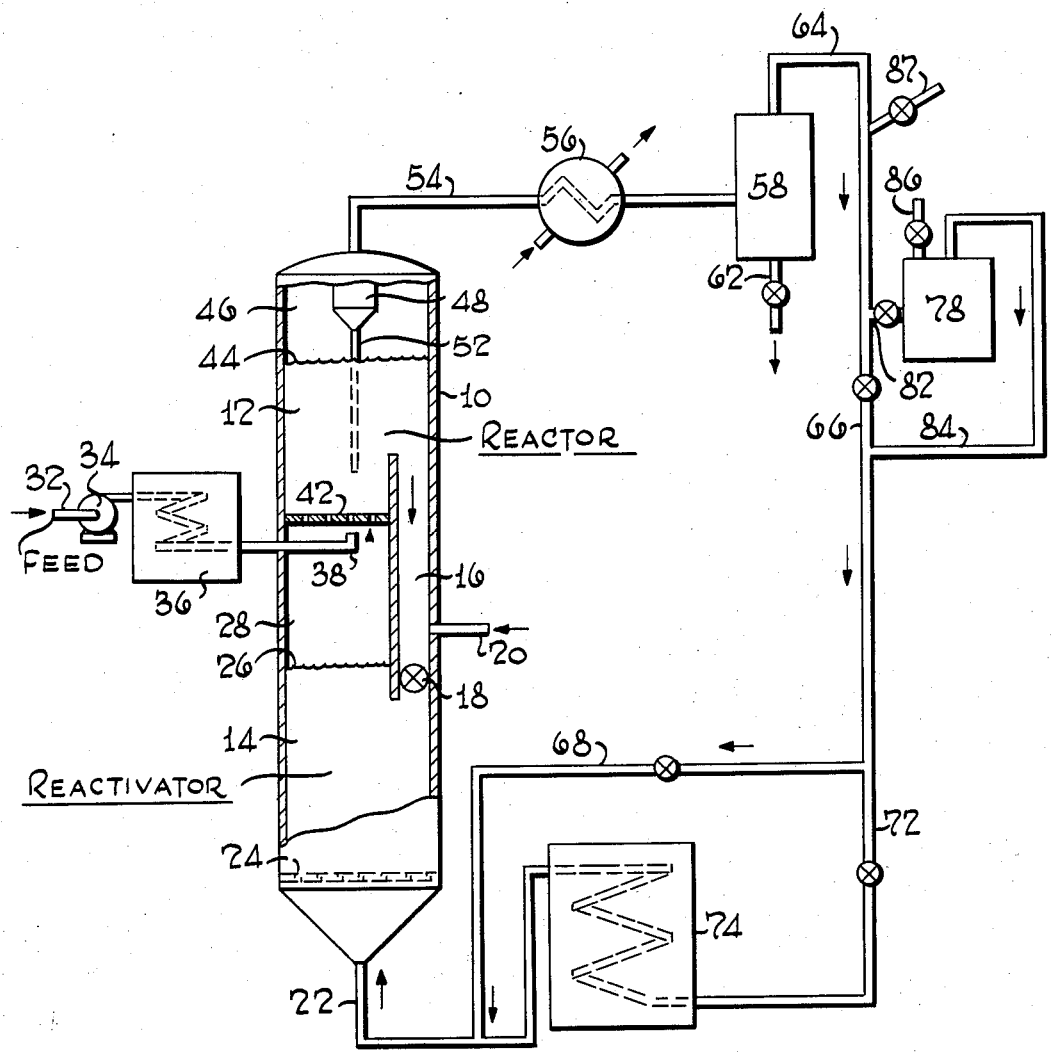

United States Patent Office 2,737,476
Patented Mar. 6, 1956

2,737,476

METHOD OF REGENERATING HYDROFORMING CATALYSTS

Robert L. Hardy and Charles E. Hemminger, Westfield, N. J., assignors to Esso Research and Engineering Company, a corporation of Delaware Application March 17, 1951, Serial No. 216,176

5 Claims. (Cl. 196—50)

This invention relates to fluid hydroforming processes in which platinum-containing catalysts are used and more particularly relates to the reactivation or regeneration of such catalysts with hydrogen or hydrogen-containing gases.

This application is a continuation in part of application, Serial No. 202,058, filed December 21, 1950, on the same subject matter, which application is now abandoned.

In commercial hydroforming processes where regeneration is necessary it is the usual practice to use air as the regenerating gas. Certain platinum catalysts used in hydroforming processes lose activity when regenerated with air. According to the present invention hydrogen regeneration or reactivation of platinum-containing catalysts is the preferred method of regeneration. The activity of the catalyst after hydrogen regeneration or reactivation is substantially the same as that of the catalyst at the beginning of the hydroforming operation.

In the known high pressure non-regenerative hydroforming processes using platinum-containing catalysts the pressure during hydroforming is above about 500 lbs. per square inch but due to the high pressure, the octane number of the gasoline obtainable is limited and high volatility gasolines are produced because of the hydrocracking occurring.

It has been recently found that improved results are obtained in hydroforming processes using platinum-containing catalysts if the pressures during hydroforming are maintained below about 500 lbs. per square inch, preferably about 50-250 lbs. per square inch. Under these conditions higher yields of higher octane number gasoline of 10 lbs. Reid vapor pressure are obtained than when operating for example at a pressure of 750 lbs. per square inch. However, at the lower preferred pressures there is deposition of coke or carbonaceous material on the catalyst which lowers the activity of the catalyst. The coke or carbonaceous material must therefore be substantially removed to restore the activity of the catalyst.

According to the present invention the catalyst containing coke or carbonaceous material is regenerated or reactivated with a hydrogen-containing gas, preferably recycle gas formed in the hydroforming process. In one form of the invention the platinum-containing catalyst with coke or carbonaceous material deposited thereon after a period of hydroforming is withdrawn as a dense fluidized mixture from the reactor and passed to a reactivation stage where it is treated at substantially hydroforming pressure and hydroforming temperature or higher temperature with a hydrogen-containing gas, which is preferably recycle gas from the hydroforming operation. The hydroforming step and hydrogen reactivation step are carried out continuously so that a continuous hydroforming process results.

In another form of operation only a single fixed bed or fluidized bed of catalyst is used with intermittent hydrogen reactivation of the catalyst. That is, the hydroforming step, where a naphtha or other hydrocarbon fraction and hydrogen are passed over the catalyst, is continued for some time at a pressure below about 250 lbs. per square inch until there is a deposition of coke or carbonaceous material on the catalyst particles and then the hydrocarbon feed is cut off while the flow of hydrogen-containing gas is continued to reactivate the catalyst in the absence of introduced hydrocarbon feed. After a short period during which the catalyst particles are reactivated, naphtha or other hydrocarbon fraction is again introduced and a mixture of the hydrocarbon fraction and hydrogen or hydrogen-containing gas are passed over the reactivated catalyst with the operation being alternatively carried out as necessary to maintain activity of the catalyst.

In another form of the invention three or more fixed beds or fluidized beds of catalyst using intermittent hydrogen reactivation in this way can be manifolded together so as to permit cyclic operation with a continuous feed of naphtha to the apparatus. Where the amount of time for reactivation exceeds the amount of time on stream by a factor of 2, 3 or more, the number of catalyst zones or vessels undergoing reactivation at a given time will exceed the number of vessels on stream by a corresponding factor of 2, 3 or more. Where two or more vessels are undergoing either reactivation or conversion operations at a given time, such vessels may be manifolded together in series or in parallel as may be desired. A series connection of vessels in such an operation may offer certain advantages. For example, such an arrangement may make it possible to reheat the reaction gases entering each vessel as may be desired to supply the heat for any endothermic reactions involved in the hydroforming or hydrogen regeneration reactions.

The feed stock for the hydroforming process is preferably a virgin naphtha but may be light or heavy naphthas, straight run naphthas, cracked naphthas or mixtures thereof with the preceding feeds or selected naphtha fractions or mixtures thereof. By hydroforming is meant an operation conducted at elevated temperatures and pressures in the presence of a solid catalyst and added hydrogen for reforming naphtha and gasoline fractions to increase the aromaticity thereof without any net consumption of hydrogen during the process. Since there is a net production of hydrogen during the process, the gas separated from the higher boiling products may be recycled to the process thereby providing the hydrogen-containing gas for the hydroforming operation.

In high pressure hydroforming operations at pressures in the range of 750 to 1000 lbs. per sq. inch, where no coke or carbonaceous deposit is laid down on the catalyst, it may be said that the rate of hydrogenation of any incipient coke deposit laid down temporarily upon the catalyst exceeds the rate at which any such reaction tending towards coke formation takes place. In low pressure hydroforming operations at about 50-250 lbs. according to the present invention, on the other hand, it may be correspondingly stated that the rate at which the coke forming reaction takes place exceeds the rate of the concomitant hydrogenation reaction which might tend to remove it. Under these conditions, the carbonaceous deposit initially laid down on the catalyst is subjected to progressively further dehydrogenation and time on stream becomes an important factor in determining the character of the residual deposit. That is to say, the coke initially laid down after a short period on stream becomes progressively further dehydrogenated, approaching the composition of graphite or hard coke. Experiments have shown that after what might be regarded as a relatively short period on stream, such as 40 hours, the coke deposit, which is easily removable by hydrogenation after a period of not more than a few hours on stream, becomes so changed in character that it is practically impossible to remove it by hydrogen treatment even though much more severe conditions of temperature and hydrogen partial pressure are employed in the effort.

It is an important feature of the present invention to limit the time on stream in a hydroforming operation using a platinum-group catalyst, so as to avoid changing the character of the coke deposit by unnecessary heat soaking into one which is not readily removed by hydrogen treatment. The exact time interval to which the on-stream period should be limited to avoid this undesirable result will vary somewhat with the severity of the hydroforming operation, being shorter under conditions where the rate of coke deposition per unit weight of catalyst is high. In general, while the process may be applied to advantage with an on-stream period of up to 200 hours or over, we prefer to use an on-stream period of not over 12 hours. Hydroforming periods of not over 3 hours in length are found to be particularly suitable.

The catalyst used in this process may be a platinum-containing catalyst prepared according to the method disclosed in an application Serial No. 202,130, filed on December 21, 1950, in the names of E. Arundale, W. R. F. Guyer and J. P. Thorn, now U. S. Patent 2,667,461, dated January 26, 1954, and reference is made thereto for complete details not included herein. A brief description of one method of making the catalyst will now be given but it is to be understood that the present process of regenerating or reactivating a hydroforming catalyst with hydrogen is not limited to this exact catalyst but may be used for regenerating other catalysts containing platinum or platinum-group metals and made by other methods.

*Example I*

About 600 grams of 8–14 mesh F–10 Alorco activated alumina were pulverized so that about 80% of the material passed a No. 60 (U. S.) sieve, and the pulverized alumina was dried at a temperature of about 250° F. overnight or for about 16 hours. The entire batch of dried alumina was then thoroughly mixed at room temperature with an aqueous solution of hydrogen fluoride (prepared by adding 12 grams of 48% aqueous hydrofluoric acid to 400 cc. of distilled water) to form a paste. The entire batch of alumina and all of the HF solution were mixed together at once. The HF solution was substantially completely absorbed by the alumina and the resulting mixture was thoroughly mixed for about ½ hour at room temperature. By paste, wherever mentioned herein, we mean a mixture of such consistency that only about 3–8% liquid of the total volume rises as a supernatant layer after standing for about 15 minutes to one-half hour. The paste was permitted to stand at room temperature overnight or for about 16 hours to provide time for reaction between the alumina base and the hydrogen fluoride. The paste was then dried overnight or for about 16 hours at a temperature of about 250° F. The amount of HF used was about 1% by weight of the alumina.

The dried paste was broken up into a powder and then 75 grams of a 10% aqueous solution of chloroplatinic acid, plus about 400 cc. of distilled water were added to the hydrogen fluoride treated alumina particles at room temperature and the entire batch was mixed for about 15 minutes until the alumina substantially completely absorbed the solution of chloroplatinic acid. In this way the solution of platinum compound impregnates the alumina particles and a very homogeneous distribution of the platinum compound on the alumina particles is obtained. The amount of platinum on the HF treated alumina was 0.5% by weight of the alumina. It is considered undesirable to add excessive water to the catalyst preparation in the two impregnating steps above described.

The paste of HF treated alumina base impregnated with the platinum compound was mixed and during mixing was treated with hydrogen sulfide gas by bubbling the hydrogen sulfide gas through the paste for about 1½ hours at a moderate rate to deposit or precipitate the platinum in situ on the alumina particles. The sulfided pasty mixture was then allowed to stand for about 4 hours at room temperature and was then put in a cold drying oven. The temperature of the oven was then raised and the paste was dried overnight or about 16 hours at about 250° F.

The dried sulfided mixture was then broken up into a powder which was pilled without a binder into cylindrical pills having a size of about 3/16" by 3/16". The pills were calcined at about 950° F. for about two hours. After calcining the pills at about room temperature were treated or reduced with hydrogen as the catalyst was slowly brought up to 900° F. overnight or in about 16 hours at atmospheric pressure, that is, the temperature was raised 75 to 125° F. per hour. The amount of hydrogen passed over the catalyst was about 100 volumes of hydrogen per volume of catalyst per hour with at least half the treatment or about 8 hours occurring at 800–900° F.

*Example II*

600 grams of 4–8 mesh H–41 Alorco activated alumina were pulverized and the pulverized alumina was dried at a temperature of about 250° F. overnight or for about 16 hours. The entire batch of dried alumina was then thoroughly mixed at room temperature with an aqueous solution of hydrogen fluoride (prepared by adding 6 grams of 48% aqueous hydrofluoric acid to 500 cc. of distilled water) to form a paste. The paste was mixed, then allowed to stand at room temperature and dried as in Example I. The dried paste was broken up into a powder and 75 grams of an aqueous 10% solution of chloroplatinic acid plus about 500 cc. of distilled water were added to the HF treated alumina particles at room temperature and mixed for about 15 minutes until the alumina substantially completely absorbed the chloroplatinic acid solution. The catalyst was then finished in the same manner given in Example I. The catalyst contained 0.5% by weight of platinum and 0.5% by weight of HF.

For preparing catalysts containing larger amounts of platinum, larger amounts of chloroplatinic acid are used and for catalysts containing more or less fluorine different amounts of HF may be used. Gaseous HF may be used but aqueous solutions of HF are preferred. Instead of using fluorine compounds other halogens such as hydrochloric acid may be used but the fluorine containing substances are preferred.

The amount of platinum in the finished catalyst is preferably between about 0.1% and 1.0% by weight but in some cases may be as high as 2.0%. The amount of HF used may vary from about .25% to 3% by weight of the catalyst with about 0.5% to 1% HF preferred. The H–41 aluminas will generally require smaller HF treats than the F–10 aluminas to produce equivalent results. For example, catalysts prepared from H–41 alumina possess optimum activity when containing about 0.5% HF, whereas those prepared from the pure aluminas (e. g. F–10) possess optimum activity when containing about 1% HF. In general, the use of higher amounts of HF, for the same set of operating conditions, will result in a more active catalyst giving more volatile gasolines (higher Reid vapor pressure) but lower octane number products so that HF treats in the range above given are to be preferred.

The above examples give specific details for the production of an improved catalyst to be used according to the present invention. This preparation may be modified in a number of respects, as shown in the above-mentioned application, Serial No. 202,130. The process of our invention is equally applicable to other platinum-group containing catalysts, including those containing palladium or other such hydroforming catalysts regenerable by treatment with hydrogen. It is particularly applicable to such catalysts prepared on an active alumina base by various combinations of impregnation, precipitation, chemical treating and heat treating stages. It is likewise applicable to platinum-containing catalysts and the like prepared from alumina sols, alumina gels and various other metal oxide catalyst carriers singly or in combination as recommended elsewhere for use in the catalytic reforming of naphthas.

Figure 2:
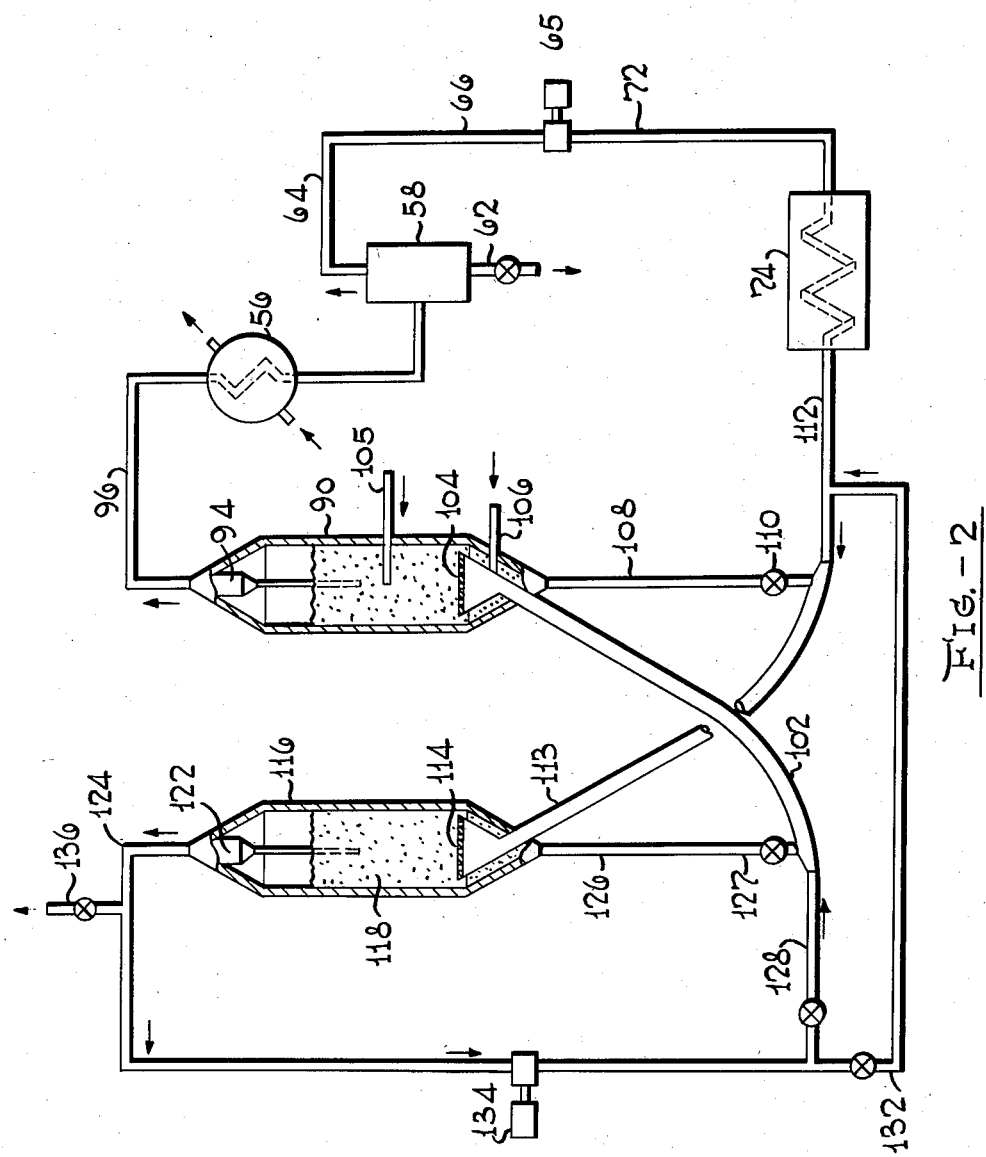

In the drawing,

Fig. 1 represents one form of apparatus adapted to carry out the process of the present invention; and Fig. 2 represents another form of apparatus.

Referring now to Fig. 1 of the drawing, the reference character 10 designates a vertically arranged cylindrical vessel having an upper dense fluidized bed of catalyst 12 and a lower dense fluidized bed of catalyst 14. Catalyst flows from the dense fluidized bed 12 through downcomer 16 provided with a control valve 18 at its lower end for controlling the amount of catalyst passing from the upper fluidized bed 12 to the lower fluidized bed 14. If necessary, fluidizing or aerating gas may be introduced at one or more points into the downcomer 16 as at 20. The aerating gas may be any inert gas but is preferably a hydrogen-containing gas such as recycle gas formed in the process.

The dense fluidized bed 12 forms the hydroforming section and the lower dense fluidized bed 14 forms the hydrogen reactivation or regeneration section of the vessel. The catalyst beds are maintained in a dense fluidized condition by hydrogen-containing gas introduced into the lower portion of vessel 10 through line 22 and passing upwardly through the distribution grid or perforated member 24 into the lower fluidized bed 14 of catalyst. The hydrogen-containing gas is passed through reactivating section 14 at such a velocity to form a dense fluidized bed having a level indicated at 26 with a less dense phase 28 thereabove containing suspended catalyst particles therein.

When hydroforming with a powdered alumina platinum-containing catalyst made as above described or by other methods and having a particle size between about 200 or 400 mesh or finer and containing particles mostly of the size between about 0 and 80 microns, the superficial velocity of the hydrogen-containing gas passing up through catalyst bed 14 is between about 0.1 foot per second and 1.0 foot per second and the dense bed 14 will have a density of between about 20 lbs. per cubic foot and 35 lbs. per cubic foot. As will be hereinafter pointed out, catalyst from the lower bed 14 passes upwardly into the upper dense fluidized bed 12 with hydrogen-containing gas so that the density of the less dense phase 28 above the lower dense fluidized bed 14 will be between about 0.2 lb. and 3.0 lbs. per cubic foot.

The hydrocarbon feed which may be a naphtha or other selected hydrocarbon fraction is passed thorugh line 32 by pump 34 and then through furnace 36 to raise the temperature of the hydrocarbon feed to about 900° F. to 1050° F. The vaporized feed is then passed through a nozzle or distributor arranged at about the middle of the vessel 10 and below distribution grid or perforated member 42 into the dense fluidized bed 12. The hydrogen-containing gas from the lower fluidized bed 14 passes upwardly through the less dense phase 28 with entrained regenerated or reactivated catalyst. The hydrogen-containing gas with the entrained reactivated catalyst is mixed with the heated hydrocarbon feed from the nozzle 38 and this mixture passes upwardly into the dense fluidized bed 12. The superficial velocity of the gases and vapors passing upwardly through the dense fluidized bed of catalyst 12 is between about 0.1 foot per second and 1.0 foot per second to maintain the catalyst particles as a dense fluidized bed 12 having a level 44 with a dilute phase or dilute suspension 46 of catalyst in gases or vapors above the level 44. The density of the dilute suspension in phase 46 is between about .001 lb. per cu. ft. and 0.2 lb. per cu. ft. The density of the fluidized bed 12 is between about 20 lbs. per cu. ft. and 35 lbs. per cu. ft.

The downcomer 16 functions as a standpipe to restore pressure on the catalyst particles being returned to the lower dense bed 14 from the upper dense fluidized bed 12. The downcomer 16 restores pressure lost in passing from the lower bed 14 to the upper bed 12. The density of the dense fluidized mixture in the standpipe 16 is between about 35 lbs. per cu. ft. and 50 lbs. per cu. ft. The catalyst to oil ratio of the mxiture fed to the hydroforming section 12 is between about 1 and 15 parts by weight. With the catalyst described herein the space velocity designated as w./hr./w. (lbs. of oil per hour per lb. of catalyst) varies from about 0.5 to 5.0, depending on the feed stocks and severity of reforming desired. The pressure during hydroforming is between about 50 lbs. per square inch and 500 lbs. per square inch, preferably about 200 lbs. per square inch and the temperature is about 800 to 975° F., preferably 900° F. The amount of the hydrogen-containing gas fed to lower bed 14 and thence to upper bed 12 is between about 1000 to 10,000 cu. ft. per barrel of oil fed to the hydroforming section 12, preferably about 4000 to 6000 cu. ft. per barrel of oil.

Returning now to the hydroforming section 12, vaporous and gaseous products leave the upper dense fluidized bed 12 and pass into dilute phase 46 containing only a small amount of suspended catalyst and gasiform producuts are then passed through gas-solids separating means 48 such as one or more cyclone separators for removing most of the entrained catalyst particles. The separated catalyst particles are returned to the upper fluidized bed 12 through dip pipe 52 extending below the level 44. The vaporous and gaseous product substantially free of catalyst particles is then passed overhead through line 54 and cooler or condenser 56 to cool the products to about 50 to 120° F. to condense normally liquid constituents.

The cooled products are then passed to separator 58 for separating gas from liquid hydroformed products. The liquid is withdrawn through line 62 and may be fractionated to remove any products higher boiling than gasoline and these higher boiling products will contain a small amount of entrained catalyst particles. The higher boiling fraction containing the catalyst may be recycled to line 32 and through the hydroforming step or the higher boiling fraction may be filtered to recover the catalyst and the liquids recovered as such or passed to a catalytic cracking or thermal cracking unit.

The gas passes overhead from separator 58 to line 64 and contains about 80 to 95% hydrogen by volume. The gas is compressed by compressor 65 and may be passed directly through lines 66 and 68 to line 22 for recycling to the lower dense fluidized bed of catalyst 14 for reactivating or regenerating the catalyst. Preferably the hydrogen-containing gas is passed through line 72 and furnace 74 for heating the gas to the hydroforming temperature but preferably higher before being passed to lower dense fluidized bed 14 for the reactivation step.

An important step in the method of this invention is the provision of means for maintaining the temperature in dense bed 14 higher than that in the dense bed 12 in the reactor, so that the rate of reactivation of the catalyst in bed 14 is accelerated. In the specific embodiment illustrated in Figure 1 this step is accomplished by heating the recycle gas in furnace 74 to a temperature higher than the reactor temperature. The temperature of bed 14 is preferably 50 to 200° F. higher than the temperature in bed 12.

The ratio or relative amounts of catalyst in beds 14 and 12 may vary from a factor of from more than one or about 2 to 10, with bed 14 holding the most catalyst. When the same or substantially the same amount of hydrogen-containing gas is passing upwardly through both beds, this ratio of the relative amounts of catalyst controls the relative contact times of the catalyst in the reaction zone 12 and in regeneration. The ratio of the time required for hydrogen regeneration to the time on stream in bed 12 should be at least 2 and preferably at least 3 times as much for the catalyst in bed 14 as in bed 12.

Sufficient gas is produced during the hydroforming process to collect excess hydrogen-containing gas and store it if desired. The excess of hydrogen-containing gas over that needed for recycling may be stored in tank 78 by being passed from line 64 through line 82. The recycle gas needed for the process is passed through line 84 to line 66. An outlet line 86 is provided for storage tank 78 for removing excess recycle or hydrogen-containing gas. When storage tank 78 is not used, excess recycle gas is removed from the system through line 87.

In another form of the invention only one fixed bed or fluidized bed of catalyst is used and during the hydroforming process the hydrocarbon feed and hydrogen are passed through the bed until coke or carbonaceous material is deposited on the catalyst particles. Then the hydrocarbon feed is stopped and only hydrogen-containing gas is passed through the catalyst bed to remove the coke or carbonaceous material and reactivate the catalyst after which hydrocarbon feed and hydrogen are again passed over the catalyst. These cycles are alternated to maintain the catalyst activity. During reactivation of the catalyst the rate of flow of the hydrogen-containing gas may be increased two or three fold, if desired, for example, in certain fluidized catalyst operations as an aid in maintaining a dense fluid bed of catalyst while stopping the flow of naphtha. We prefer, however, to use substantially the same hydrogen-containing gas flow rate both on stream and during catalyst reactivation. Here again, the temperature of reactivation is preferably maintained higher than the hydroforming temperature, as by having the recycle gas heated to a higher temperature than the average temperature in the reactor during hydroforming. In this form of the invention it is preferred to have three or more hydroforming reactors so that the flow of hydrocarbon feed can be continuous through the preheating furnace and the flow of products to the recovery system can be kept continuous. Also some of the hydrogen formed in the hydroforming reactor in operation can be used for reactivating the catalyst in another hydroforming reactor when the flow of hydrocarbon feed is stopped to that reactor to permit hydrogen reactivation of the catalyst.

In the form of the invention shown in Fig. 2 of the drawing separate hydroforming and reactivation zones are used with the catalyst being circulated between the two zones. In Fig. 2 the reference character 90 designates a hydroforming reactor containing a fluidized bed of catalyst 92. The hydroformed products passing into the dilute phase above the dense bed 92 are passed through suitable gas-solids separating means such as a cyclone separator 94 and the gasiform hydroformed products containing a small amount of entrained catalyst particles are passed through line 96 to the recovery system which is substantially the same as that described in connection with Fig. 1. The same reference characters are used in the recovery system and in the recycle of the hydrogen-containing gas so that further description of this part of the apparatus is not necessary.

Reactivated catalyst particles suspended in hydrogen-containing gas are passed through line 102 and grid or distribution member 104 in the lower portion of the hydroforming reactor 90. Hot vaporous hydrocarbon feed is introduced as may be desired, through line 105 leading directly into fluid bed 92 or through line 106 below the distribution or grid member 104 for admixture with the hot reactivated catalyst and gas going to the reactor 90. Catalyst particles containing carbonaceous deposits are withdrawn from the lower portion of the dense fluidized bed 92 and passed through standpipe 108 having a control valve 110 at its lower end. If desired, aeration and stripping gas, preferably hydrogen-containing gas, may be introduced into standpipe 108 and into the lower portion of the reactor to maintain the particles in fluidized condition.

The catalyst particles are suspended in recycle hydrogen-containing gas from line 112 and the suspension passed through line 113 through distribution or grid member 114 arranged in the lower portion of the reactivation zone 116. Zone 116 contains a fluidized bed of catalyst 118. The gases leaving the dilute phase above the dense bed 118 are passed through a gas-solids separating means such as cyclone separator 122 for separating some of the entrained catalyst from reactivation gases. The reactivation hydrogen-containing gases leave the upper part of reactivation zone 116 through line 124.

Reactivated catalyst particles are withdrawn from the bottom of reactivation zone 116 through standpipe 126 having a control valve 127 at its lower portion. Aerating and stripping gas, preferably hydrogen-containing gas, is preferably added to standpipe 126 and the lower portion of reactivation zone 116 to maintain the particles in fluidized condition. All or a portion of the reactivating gases passing through line 124 are passed through line 128 for suspending the reactivated catalyst particles leaving standpipe 126 to form a suspension which is passed through line 102 as heretofore described. If desired, some of the reactivating gas from line 124 may be passed through line 132 with the aid of hot gas circulator 134 for recycling to line 112 for return to the reactivation zone 116. Excess gases may be vented from the system through line 136.

Circulator 134 may be located in line 124, as shown, to increase the pressure and circulation rate of the recycle gas stream in both lines 128 and 132. It may also be located in line 132, in which case the pressure in lines 128 and 102 will be slightly lower, and the resultant pressure in reactivator 116 will be correspondingly slightly higher than the pressure in reactor 92, which may be an advantage in speeding the reactivation process.

While the line 132 is shown as leading to line 112 after the recycle gas has passed through furnace 74 it is within the contemplation of the invention to return the gas in line 132 to line 72 ahead of the furnace 74 so that additional heat may be supplied to this portion of the recycle gas. In this form of the invention as in that shown in Fig. 1, the hot reactivated catalyst and the hot effluent gas from the reactivation zone which gas serves as reactor recycle gas will supply a good portion of the heat of reaction of the endothermic hydroforming reaction. Instead of being used as a catalyst carrier gas, recycle gas in line 128 may be passed directly to reactor 90, and recycle gas in line 112 may be passed directly to the reactivation zone 116.

While standpipes and dilute suspension carrier lines have been shown in the apparatus of Fig. 2 any other well known methods of circulating fluid solids may be used. For example, catalyst in a dense fluidized condition may flow from the reactor to the regenerator or reactivation zone by gravity in which case the catalyst would enter the top of the reactivation zone and leave at the bottom of the reactivation zone to be transported back to the hydroforming reactor by a carrier gas or other means.

Higher yields of higher octane number gasoline of the desired volatility are produced with a hydroforming process using platinum-containing catalyst when pressures lower than those heretofore used are selected and these results are superior to those heretofore obtained using the usual hydroforming catalysts containing molybdenum. At the lower pressure and using catalysts containing platinum, there is a deposition of coke and carbonaceous material and the catalyst must be regenerated. According to this invention the regeneration is accomplished with hydrogen which is produced in the process and the hydrogen-containing gas is used at the operating pressure or the pressure at which hydroforming is carried out and at temperatures higher than the hydroforming temperature.

In the process described in connection with the drawing Fig. 2, as with Fig. 1, the naphtha feed stock heated to about 1000° F. is passed through the dense fluidized bed of catalyst 92 in the reactor vessel 90. This feed stock enters through line 105 or heated and reactivated catalyst from the reactivation bed 118 is mixed with the heated naphtha entering through line 106 and going to fluidized bed 92. The catalyst to oil ratio by weight may be about 3, varying within the range from about 10 to 1. The w./hr./w. in the hydroforming section 92 is about 2 but may be in the range between about 0.5 and 4. Some coke or carbonaceous material is deposited on the catalyst particles and they are withdrawn from the hydroforming bed 92 through downcomer or standpipe 108 and introduced similarly together with heated recycle gas into the reactivation or regeneration fluid bed 118 which is maintained at a temperature of about 900 to 1300° F., preferably 1000° F.

The amount of coke or carbonaceous material on the catalyst will be about 1.5% by weight of catalyst but may be in the range of 0.5 to 5% by weight of the catalyst. Recycle gas containing 80% to 95% by weight hydrogen from line 66 may be passed through reactivation bed 118 at a superficial velocity between about 0.1 to 1.0 foot per second to reactivate the catalyst. However, it is preferred practice to heat the recycle gas containing hydrogen and therefore it is passed through line 72 and heater 74 to heat the recycle gas to about 1000° F. to 1400° F. The recycle gas containing hydrogen at a temperature of 1000° F. to 1400° F. may be combined, if desired, with a portion of the hot effluent gas from regenerator 116 passing through line 132 and circulator 134 into line 112. This stream picks up the catalyst from downcomer 108 and is passed therewith through line 113 and grid member 114 into the dense fluidized bed 118, for removing substantially all the coke or carbonaceous material from the catalyst particles so that the reactivated catalyst contains about 0.1 to 0.3% by weight of coke or carbonaceous material. The catalyst particles remain in fluid bed 118 two to ten times as long as they do in fluid bed 92.

The reactivated catalyst particles at a temperature of 925° F. to 1300° F. are then withdrawn from the bottom of reactivation zone 116 through standpipe 126, carried through line 102 as a suspension in hot effluent gas from zone 116, mixed with heated naphtha either below or above grid member 104 where the mixture of catalyst and recycle gas is passed into the dense fluidized catalyst bed 92 in the hydroforming section. With the present invention a continuous fluid hydroforming process is provided for hydroforming naphthas or the like at pressures in the range between about 50 lbs. per square inch and 500 lbs. per square inch to produce higher yields of higher octane number of gasoline of desired volatility than have been produced heretofore in reforming processes.

In the modification of the invention using only one fixed bed or fluid bed of catalyst containing platinum the hydroforming process is carried on for a selected interval with the naphtha or other hydrocarbon feed and hydrogen passing through the catalyst bed for a period of not over 12 hours, preferably less than 3 hours, at a hydroforming pressure of about 200 lbs. per square inch and a temperature of about 900° F. After this interval, which may be about 1 hour, the flow of naphtha or hydrocarbon feed is shut off and only recycle gas or other gas containing hydrogen is passed through the catalyst bed, the recycle gas having preferably been heated to about 1000° F. to 1300° F. The hydrogen-containing gas is under a pressure of about 200 lbs. per square inch or about the same pressure that is maintained during hydroforming and at a constant gas feed rate equivalent to about 4000 to 6000 cubic feet of gas per barrel of oil fed to the bed during the hydroforming stage. The feed of recycle gas alone in the absence of naphtha vapors is continued under these conditions for a period of time at least twice the hydroforming period, preferably 3 times the hydroforming period, to reactivate the catalyst and remove substantially all the coke or carbonaceous material. After this reactivation of the catalyst the naphtha feed is again cut in so that naphtha and hydrogen-containing gas are passed through the catalyst bed to hydroform additional amounts of naphtha in another cycle. These cycles of hydroforming and hydrogen reactivation of the catalyst are repeated at intervals to produce the superior results above described. It will be obvious that several fixed beds or fluid beds of catalyst operating on this cycle may be manifolded together in such a manner as to provide a continuous path for naphtha vapors through at least one vessel on stream while the catalyst in other vessels is undergoing reactivation. In such operations, the recycle gas from the reactor or reactors on stream may be used in series or in parallel as the gas feed to the catalyst in other vessels undergoing reactivation, and gas so used may be further recycled as a portion of the feed to vessels either on stream or undergoing reactivation. In any such arrangement it is preferable to maintain the hydrogen-containing gas flow rate in the vessels undergoing reactivation equal to or greater than the flow rate in vessels on stream.

Test data to point out the effectiveness of hydrogen regeneration in maintaining the activity of a platinum-containing catalyst over long periods of time are shown in the following example.

*Example III*

A virgin naphtha fraction having a boiling range of about 200 to 360° F. and a clear octane number of about 45 by the CFR-Research method of test was hydroformed over a catalyst containing 0.5% by weight of platinum on a 1.0% HF treated alumina, prepared according to the method described above in Example I. Data on the product quality obtained when using this catalyst with hydrogen regeneration over an extended period of time are presented graphically in Figure 3. These data were obtained under uniform temperature and pressure conditions of about 900° F. and 200 lbs. per square inch, with an oil feed rate of 1 w./hr./w. (or 2 w./hr./w.) during the on-stream period. This plot shows the clear Research O. N. of the total liquid product, substantially butane-free, as a function of time on stream for two different runs. Product quality was maintained at a level of 95–97 octane number for several hundred hours under the conditions of the present invention. Furthermore, as shown in this plot and discussed in detail below, departures from the preferred conditions herein described gave significantly less favorable results.

Figure 3:
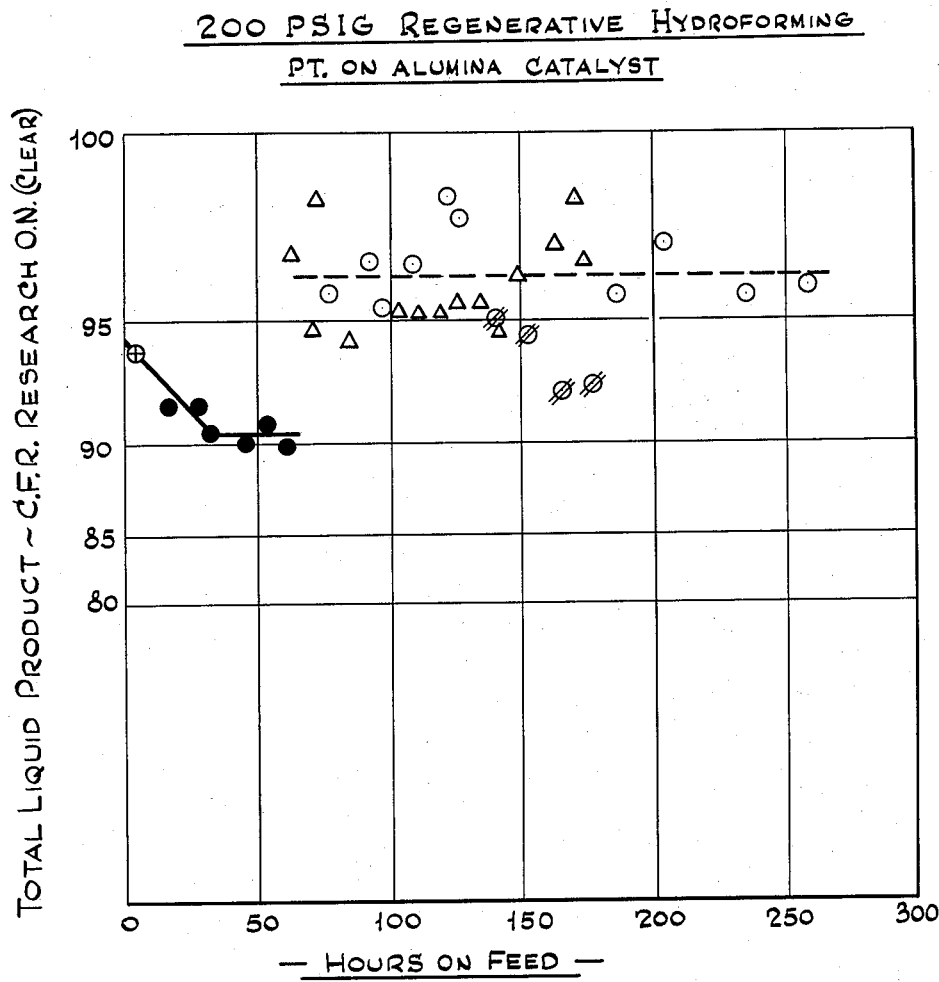

In one run, shown by the circles in Figure 3, the catalyst used was a batch which had been previously tested some 200 hours in 750 lb. non-regenerative hydroforming. Under these conditions the catalyst had suffered a slight loss in its initial high activity, equivalent to about 3 O. N. units in quality of the total liquid product. At the beginning of the 200 lb. operation, this catalyst gave a product having 94 octane number, when feeding oil at a space velocity of 2 w./hr./w. together with a hydrogen-containing gas stream at the rate of 6000 cubic feet per barrel of oil feed. This same feed rate was continued, without hydrogen regeneration, for a period of about 28 hours. The data for this period represented by the X'd circles in the plot, show a rapid drop in O. N. to about 92. At this time the catalyst was reactivated for 6 hours in the absence of naphtha, using twice the original hydrogen-containing gas feed rate. Naphtha feed was then resumed at a 2 space velocity, continuing for an additional 11 cycles of 3 hours on stream and 6 hours on regeneration in this way. This portion of the run is shown by the closed circles in Figure 3. The initial drop in octane number continued only for one cycle to about 91, and product quality then remained constant at this level.

It is apparent that this combination of naphtha feed rate and reactivation conditions was enough to arrest any further decline in catalyst activity, but not enough to restore the activity loss in the initial period when no hydrogen regeneration was employed. Accordingly, the naphtha feed rate was cut from 2 to 1 w./hr./w., maintaining the same cycle of 3 hours on stream and 6 hours reactivation as above. Under these conditions, as shown by the open circles in the plot, product quality increased promptly to an octane number from about 95–97, which was maintained for the remainder of the run. It should be pointed out that the time shown in this plot represents only time on stream, so that total time on heat is 3 times as long including the time on regeneration.

During the course of this run, at about hours 130–175, the hydrogen-containing gas rate was cut for a few reactivation cycles to the equivalent of about 6000 cubic feet per barrel of oil in the on-stream period, as shown by the slashed circles in the plot. Under these conditions, where the total amount of hydrogen during the reactivation period was 2 times rather than 4 times the amount fed during the hydroforming stage of the cycle, product quality held at about 95 octane number for a few cycles and then dropped off to 93. Activity was restored promptly to the previous level on increasing the reactivation gas rate again to the equivalent of 12,000 cubic feet per barrel of oil feed. These data indicate that with the same rate of hydrogen on stream and in reactivation, a reactivation period of twice the conversion period is not quite enough to maintain catalyst activity when the same hydrogen feed rate is used on stream and in reactivation.

A second run using the same naphtha feed temperature and pressure was then carried out, using a conversion period of 1 hour on stream followed by 3 hours reactivation, with the same feed rate of hydrogen-containing gas throughout equivalent to 6000 cubic feet per barrel of oil feed. The data in this run, at a naphtha feed rate of 1 w./hr./w., are shown by the open triangles in Figure 3. The catalyst used in this run had been partially deactivated in the first part of the run in a manner similar to that used in the previous run described above, and the product quality level established and maintained during the period of operation described is seen to be substantially the same in both cases. No disadvantage appeared in carrying out the reactivation and on-stream periods at the same hydrogen-containing gas feed rate, as long as the reactivation period was three times as long as the on-stream period instead of twice as long and the on-stream period was itself kept short.

This type of operation with a substantially constant gas feed rate offers a distinct economic advantage, in view of the fact that considerable expense is involved in recycling excess gas to give a substantial increase in the gas flow rate during one stage of the cycle. A similar advantage can be realized by the application of the present invention to any type of hydroforming process, whether fixed bed, fluid, or other modifications thereof.

This invention may be used for regenerating the precious metal catalysts used in hydroforming.

What is claimed is:

1. The process of hydroforming a naphtha hydrocarbon feed to produce a high yield of naphtha of high octane number which comprises vaporizing the hydrocarbon feed and passing said vapors together with a hydrogen-containing gas into a bed of highly active regenerated catalyst particles containing about 0.1 to 2.0% by weight of platinum on an alumina base, said catalyst being maintained within a reaction zone at a pressure of from about 50 to below 500 pounds per square inch and a temperature of between about 800° and 975° F., permitting the hydrocarbon vapors to remain in contact with the catalyst in said reaction zone for a sufficient period of time to effect the desired conversion and recovering from said hydroforming zone a hydroformed product of high octane number while gradually deactivating said catalyst by the deposition of coke or solid carbonaceous material thereon, continuing the contact of said hydrocarbon feed with catalyst in the reaction zone for a period of over about 4 hours on stream during which from about 0.5 to 5% by weight of coke is deposited on said catalyst, subsequently treating catalyst particles deactivated by said coke deposit with a hydrogen-rich gas for a period sufficient to substantially remove said deposit therefrom and regenerate their catalytic activity, and reusing said regenerated catalyst for the treatment of additional hydrocarbon feed vapors under said hydroforming conditions.

2. The process according to claim 1 in which the hydroforming zone during said coke forming reaction for the production of high octane naphtha is maintained at a pressure from about 50 to 250 per square inch.

3. The process according to claim 1 in which the coke content on the regenerated catalyst is reduced to about 0.1 to 0.3 per cent by weight.

4. A process according to claim 1 in which the hydroforming period is no longer than about 12 hours, a hydrogen-containing gas is supplied during said on stream period at a flow rate of not more than about 6,000 cubic feet per barrel of oil and the hydrogen-containing gas flow is continued for a period of time at least twice as long during said reactivation at a flow rate not substantially greater than that maintained during the hydroforming step.

5. The process according to claim 1 in which the temperature of the hydrogen-containing gas and catalyst undergoing regeneration is at least 50° to 200° F. higher than the catalyst in contact with the hydrocarbon vapors and hydrogen-containing gas during the hydroforming step.

References Cited in the file of this patent

UNITED STATES PATENTS

| | | |
|---|---|---|
| 2,322,863 | Marschner et al. | June 29, 1943 |
| 2,472,844 | Munday et al. | June 14, 1949 |
| 2,479,110 | Haensel | Aug. 16, 1949 |
| 2,500,776 | Teter | Mar. 14, 1950 |

FOREIGN PATENTS

| | | |
|---|---|---|
| 577,008 | Great Britain | May 1, 1946 |